(12) United States Patent
Greiner

(10) Patent No.: US 11,395,490 B2
(45) Date of Patent: Jul. 26, 2022

(54) HERBICIDAL COMPOSITION

(75) Inventor: Anja Greiner, Weinheim (DE)

(73) Assignee: SYNGENTA CROP PROTECTION, LLC, Greensboro, NC (US)

(*) Notice: Subject to any disclaimer, the term of this patent is extended or adjusted under 35 U.S.C. 154(b) by 1107 days.

(21) Appl. No.: 11/909,022

(22) PCT Filed: Mar. 17, 2006

(86) PCT No.: PCT/EP2006/002467
§ 371 (c)(1),
(2), (4) Date: Sep. 18, 2007

(87) PCT Pub. No.: WO2006/097322
PCT Pub. Date: Sep. 21, 2006

(65) Prior Publication Data
US 2008/0318780 A1  Dec. 25, 2008

(30) Foreign Application Priority Data
Mar. 18, 2005 (GB) .................... 0505645.2

(51) Int. Cl.
*A01N 43/80* (2006.01)

(52) U.S. Cl.
CPC .................... *A01N 43/80* (2013.01)

(58) Field of Classification Search
CPC ........ A01N 43/80; A01N 43/40; A01N 41/10; A01N 2300/00
See application file for complete search history.

(56) References Cited

U.S. PATENT DOCUMENTS

| | | | |
|---|---|---|---|
| 4,834,908 A * | 5/1989 | Hazen ................ | A01N 25/02 106/250 |
| 6,147,031 A | 11/2000 | Adachi et al. | |
| 7,833,939 B2 * | 11/2010 | Takahashi ............ | A01N 43/80 504/156 |
| 2004/0033897 A1 * | 2/2004 | Haas .................... | 504/255 |
| 2004/0106518 A1 * | 6/2004 | Ziemer ................ | A01N 43/80 504/106 |
| 2005/0256004 A1 | 11/2005 | Takahashi | |

FOREIGN PATENT DOCUMENTS

| | | |
|---|---|---|
| JP | H11240872 A | 9/1999 |
| WO | 02/085120 A2 | 10/2002 |
| WO | 02/087322 A2 | 11/2002 |
| WO | 02/098229 A | 12/2002 |
| WO | 03/047340 A2 | 6/2003 |
| WO | 03/047344 A | 6/2003 |
| WO | 2004/014138 A | 2/2004 |
| WO | 2005/104848 A | 11/2005 |

OTHER PUBLICATIONS

Jianhua Zhang et al., Antagonism and Synergism Between Herbicides: Trends From Previous Studies, Weed Technology, 1995, vol. 9, Issue 1, pp. 86-90.

* cited by examiner

*Primary Examiner* — Johann R Richter
*Assistant Examiner* — Danielle Sullivan
(74) *Attorney, Agent, or Firm* — BakerHostetler; Toni-Junell Herbert

(57) ABSTRACT

A herbicidal composition comprising; (A) 3-[[[5-(difluoromethoxy)-1-methyl-3-(trifluoromethyl)-1H-pyra-zol-4-yl]methyl]-sulfonyl]-4,5-dihydro-5,5-dimethyl-isoxazole, or a herbicidally effective salt; and (B) a second herbicide selected from; (B1) 4-hydroxy-3-[[2-[(2-methoxyethoxy)methyl]-6-(trifluoromethyl)-3-pyridinyl]carbonyl]-bicyclo[3.2.1]oct-3-en-2-one, (B2) tembotrione, and (B3) topramezone, or their herbicidally effective salts.

33 Claims, No Drawings

HERBICIDAL COMPOSITION

This application is a 371 of International Application No. PCT/EP2006/002467 filed Mar. 17, 2006, which claims priority to GB 0505645.2 filed Mar. 18, 2005, the contents of which are incorporated herein by reference.

The present invention relates to a herbicidal composition and to a method of controlling the growth of undesirable vegetation using this composition or a combination of its components.

The protection of crops from weeds and other undesirable vegetation is a constantly recurring problem in agriculture. There are an extensive variety of herbicidal chemicals and chemical formulations known for the control of such weeds. Chemical herbicides of many types have been disclosed in the literature and a large number are in commercial use.

Certain kinds of isoxazoline compounds are known to display herbicidal activity; compound (A) and its preparation are known, for example, from US 2004/110749. Mixtures of isoxazoline compounds with commercial herbicides are disclosed, for example, in US 2005/256004.

HPPD (4-hydroxyphenylpyruvate-dioxygenase) inhibitors are known to have herbicidal activity. The compounds (B1), (B2) and (B3) and their preparation are known, for example, from WO/0015615, WO 00/021924 and WO 98/31681. Mixtures of HPPD inhibitors with commercial herbicides are disclosed, for example, in WO 99/65314.

Surprisingly, it has now been found that a combination of an active ingredient (A) with one or more of the active ingredients (B1), (B2) and (B3) are unexpectedly effective in controlling weeds.

The present invention relates to a herbicidal composition comprising;
(A) 3-[[[5-(difluoromethoxy)-1-methyl-3-(trifluoromethyl)-1H-pyrazol-4-yl]methyl]-sulfonyl]-4,5-dihydro-5,5-dimethyl-isoxazole (CAS RN 447399-55-5), or a herbicidally effective salt; and
(B) a second herbicide selected from;
(B1) 4-hydroxy-3-[[2-[(2-methoxyethoxy)methyl]-6-(trifluoromethyl)-3-pyridinyl]carbonyl]-bicyclo[3.2.1]oct-3-en-2-one (CAS RN 352010-68- 5),
(B2) tembotrione (CAS RN 335104-84-2), and
(B3) topramezone (CAS RN 210631-68-8),
or their herbicidally effective salts.

The herbicides (A), (B1), (B2) and (B3) are independently known in the art for their effects on plant growth.

3-[[[5-(Difluoromethoxy)-1-methyl-3-(trifluoromethyl)-1H-pyrazol-4-yl]methyl]sulfonyl]-4,5-dihydro-5,5-dimethyl-isoxazole (A) and its preparation is known from US 2004/110749; mixtures of this compound with other herbicides is known from US 2005/256004.

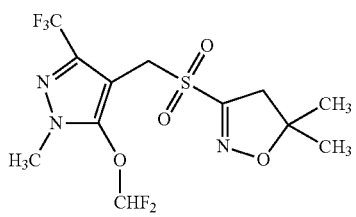

4-Hydroxy-3-[[2-[(2-methoxyethoxy)methyl]-6-(trifluoromethyl)-3-pyridinyl]-carbonyl]bicyclo[3.2.1]oct-3-en-2-one (B1) and its preparation is known from WO 00/15615;

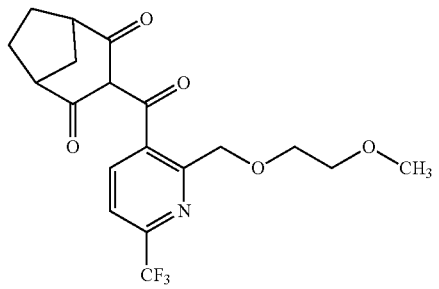

Tembotrione (B2) is known from WO 00/021924;

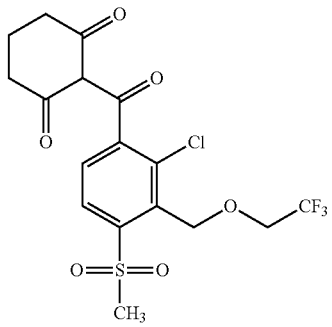

Topramezone (B3) is described in WO 98/31681, and mixtures of this compound with herbicides are known from WO 99/65314.

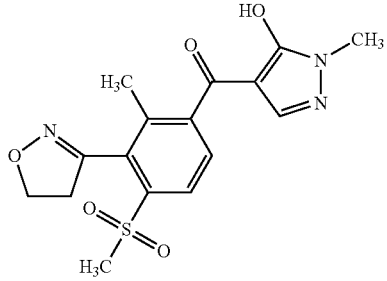

Especially preferred compositions according to the invention are:

A composition wherein component (B) is 4-hydroxy-3-[[2-[(2-methoxyethoxy)-methyl]-6-(trifluoromethyl)-3-pyridinyl]carbonyl]-bicyclo[3.2.1]oct-3-en-2-one, or a herbicidally effective salt.

A composition wherein component (B) is tembotrione, or a herbicidally effective salt.

A composition wherein component (B) is topramezone, or a herbicidally effective salt.

More than one component (B) can be used.

The compositions of the present invention can provide one or more of a number of advantages over the use of the individual components (A) and (B). The rates of application of the individual components can be markedly reduced while maintaining a high level of herbicidal efficacy. The composition can have a considerably broader weed spectrum against which it is effective than does either of the components alone. The composition can have the potential to control weed species at a low application rate at which the individual compounds alone are ineffective. The composition can have a speed of action which is faster than that which would have been predicted from the speed of the individual components.

The composition contains a herbicidally effective amount of a combination of component (A) and component (B). The term "herbicide" as used herein means a compound that controls or modifies the growth of plants. The term "herbicidally effective amount" means the quantity of such a compound or combination of such compounds that is capable of producing a controlling or modifying effect on the growth of plants. Controlling or modifying effects include all deviation from natural development, for example: killing, retardation, leaf burn, albinism, dwarfing and the like. The term "plants" refers to all physical parts of a plant, including seeds, seedlings, saplings, roots, tubers, stems, stalks, foliage, and fruits.

The compositions of this invention preferably also comprise an agriculturally acceptable carrier therefor. The compositions of the invention can be formulated as granules, as wettable powders, as emulsifiable concentrates, as powders or dusts, as flowables, as solutions, as suspensions or emulsions, or as controlled release forms such as microcapsules. These formulations can contain as little as about 0.5% to as much as about 95% or more by weight of active ingredient. The optimum amount for any given compound will depend upon formulation, application equipment, and nature of the plants to be controlled.

Wettable powders are in the form of finely divided particles that disperse readily in water or other liquid carriers. The particles contain the active ingredient retained in a solid matrix. Typical solid matrices include fuller's earth, kaolin clays, silicas and other readily wet organic or inorganic solids. Wettable powders normally contain about 5% to about 95% of the active ingredient plus a small amount of wetting, dispersing, or emulsifying agent.

Emulsifiable concentrates are homogeneous liquid compositions dispersible in water or other liquid, and may consist entirely of the active compound with a liquid or solid emulsifying agent, or may also contain a liquid carrier, such as xylene, heavy aromatic naphthas, isophorone and other non-volatile organic solvents. In use, these concentrates are dispersed in water or other liquid and normally applied as a spray to the area to be treated. The amount of active ingredient may range from about 0.5% to about 95% of the concentrate.

Granular formulations include both extrudates and relatively coarse particles, and are usually applied without dilution to the area in which suppression of vegetation is desired. Typical carriers for granular formulations include sand, fuller's earth, attapulgite clay, bentonite clays, montmorillonite clay, vermiculite, perlite and other organic or inorganic materials which absorb or which can be coated with the active compound. Granular formulations normally contain about 5% to about 95% active ingredients which may include surface-active agents such as heavy aromatic naphthas, kerosene and other petroleum fractions, or vegetable oils; and/or stickers such as dextrins, glue or synthetic resins.

Dusts are free-flowing admixtures of the active ingredient with finely divided solids such as talc, clays, flours and other organic and inorganic solids that act as dispersants and carriers.

Microcapsules are typically droplets or granules of the active material enclosed in an inert porous shell which allows escape of the enclosed material to the surroundings at controlled rates. Encapsulated droplets are typically about 1 to 50 microns in diameter. The enclosed liquid typically constitutes about 50 to 95% of the weight of the capsule, and may include solvent in addition to the active compound. Encapsulated granules are generally porous granules with porous membranes sealing the granule pore openings, retaining the active species in liquid form inside the granule pores. Granules typically range from 1 millimeter to 1 centimeter, preferably 1 to 2 millimeters in diameter. Granules are formed by extrusion, agglomeration or prilling, or are naturally occurring. Examples of such materials are vermiculite, sintered clay, kaolin, attapulgite clay, sawdust and granular carbon. Shell or membrane materials include natural and synthetic rubbers, cellulosic materials, styrene-butadiene copolymers, polyacrylonitriles, polyacrylates, polyesters, polyamides, polyureas, polyurethanes and starch xanthates.

Other useful formulations for herbicidal applications include simple solutions of the active ingredient in a solvent in which it is completely soluble at the desired concentration, such as acetone, alkylated naphthalenes, xylene and other organic solvents.

These formulations can include wetting, dispersing or emulsifying agents which can facilitate application, for example spray droplet formation, wetting of plant leaves and uptake by plants. Examples are alkyl and alkylaryl sulfonates and sulfates and their salts; polyhydric alcohols; polyethoxylated alcohols; esters and fatty amines. These agents, when used, normally comprise from 0.1% to 15% by weight of the formulation.

Further, other biocidally active ingredients or compositions may be combined with the composition of this invention. For example, the compositions may contain, in addition to components (A) and (B), insecticides (for example pyrethroids, permethrin, lambda cyhalothrin, cypermethryn, thiamethoxam, carbamates, organophosphates), fungicides (for example strobilurins, such as azoxystrobin, chlorothalonil, triazoles, such as propiconazole), growth regulators (for example mepiquat chloride), bactericides, acaracides or nematicides, in order to broaden the spectrum of activity.

The composition can be made as a single package containing the herbicides together with other ingredients of the formulation (diluents, emulsifiers, surfactants, etc.). Alternatively the composition can be prepared by tank mixing, in which the components (A) and (B) are mixed, together with other ingredients of the formulation, shortly before use at the grower site, for example by mixing the components in a spray tank or holding tank ready for application.

The invention also relates to the use of the compositions in a method of controlling the growth of undesirable vegetation (weeds), particularly in crops of useful plants, such as, for example, crops of maize, soya or cereal.

It is preferred to apply the compositions of the invention so that the total amount of active ingredient is between 1 to 4000 g per hectare. (A) is applied at between 1 and 1000 g per hectare, more preferably 1 to 500 g/ha. The preferred amount of compound (B) will vary according to the exact chemical nature of (B) and its herbicidal efficacy. For example, (B1) is applied at between 1 and 1000 g/ha, preferably between 10 and 500 g/ha. (B2) is applied at between 1 and 1000 g/ha, preferably between 10 and 500 g/ha. (B3) is applied at between 1 and 1000 g/ha, preferably between 1 and 300 g/ha. The ratios of the two components vary for the same reasons. The ratio of (A) to (B) when (B)

is (B1) is between 1:1000 and 1000:1, preferably between 1:100 and 100:1. The ratio of (A) to (B) when (B) is (B2) is between 1:1000 and 1000:1, preferably between 1:100 and 100:1. The ratio of (A) to (B) when (B) is (B3) is between 1:1000 and 1000:1, preferably between 1:100 and 100:1. Once it is appreciated that synergy is obtainable by the present invention, it is a routine matter to determine the appropriate level of each component required to achieve the desired level of weed control.

The compositions can be applied to the locus where weed control is desired by a convenient method. The "locus" is intended to include soil, seeds, and seedlings, as well as established vegetation.

The composition can be used over a wide range of crops, for example perennial crops such as vines, citrus fruit, olives, pomme stone fruit, nuts, oil palms, rubber or vegetables, and annual arable crops such as cotton, corn, oilseed rape, rice, soya, sugar beet, sugar cane or wheat.

Suitable crops include those which are tolerant to one or more of components (A) or (B). Tolerance means a reduced susceptibility to damage caused by a particular herbicide compared to the conventional crop breeds. The tolerance can be natural tolerance produced by selective breeding or can be artificially introduced by genetic modification of the crop.

The crops can alternatively, or in addition, be genetically modified to be resistant to other unrelated things such as insects or fungi, for example insect resistant cotton, or corn which is resistant to corn-borer or rootworm. Such resistance traits are well-known and crops having such traits are commercially available.

The composition of the present invention can be applied in a variety of ways known to those skilled in the art, at various concentrations. The composition is useful in controlling the growth of undesirable vegetation by preemergence or postemergence application to the locus where weed control is desired.

These formulations can be applied to the areas where weed control is desired by conventional methods. Dust and liquid compositions, for example, can be applied by the use of power-dusters, broom and hand sprayers and spray dusters. The formulations can also be applied from airplanes as a dust or a spray or by rope wick applications. To modify or control growth of germinating seeds or emerging seedlings, dust and liquid formulations can be distributed in the soil or applied to the soil surface only, by spraying or sprinkling. The formulations can also be applied by addition to irrigation water. Dust compositions, granular compositions or liquid formulations applied to the surface of the soil can be distributed below the surface of the soil by conventional means such as disking, dragging or mixing operations.

Pressurized sprayers, wherein the active ingredient is dispersed in finely-divided form as a result of vaporization of a low boiling dispersant solvent carrier, may also be used.

Components (A) and (B) as defined above can also be used in a method for controlling undesirable vegetation comprising separately applying to the locus of such vegetation herbicides (A) and (B), sequentially in either order, as part of a single weed control regime. The components can be each applied to the locus where weed control is desired within a single season. Preferably they are applied close enough together in time for there to be an interaction between the two components (A) and (B). Such a period can be for example within six weeks of each other, more preferably within two weeks, most preferably within one week.

The mixtures according to the invention can also be used in combination with one or more safeners. The safeners can be cloquintocet-mexyl (CAS RN 99607-70-2) or a lithium, sodium, potassium, calcium, magnesium, aluminium, iron, ammonium, quaternary ammonium, sulfonium or phosphonium salt thereof such as those disclosed in WO 02/34048, fenchlorazole (CAS RN 103112-36-3), fenchlorazole-ethyl (CAS RN 103112-35-2), mefenpyr (CAS RN 135591-00-3), mefenpyr-diethyl (CAS RN 135590-91-9), isoxadifen (CAS RN 209866-92-2), isoxadifen-ethyl (CAS RN 163520-33-0), furilazole (CAS RN 121776-33-8) and the corresponding R isomer (CAS RN 121776-57-6), benoxacor (CAS RN 98730-04-2), dichlormid (CAS RN 37764-25-3), MON4660 (CAS RN 71526-07-3), oxabetrinil (CAS RN 74782-23-3), cyometrinil (CAS RN 78370-21-5) and the corresponding (Z) isomer (CAS RN 63278-33-1), fenclorim (CAS RN 3740-92-9), cyprosulfamide (CAS RN 221667-31-8), N-isopropyl-4-(2-methoxy-benzoylsulfamoyl)-benzamide (CAS RN 221668-34-4), naphthalic anhydride (CAS RN 81-84-5) and flurazole (CAS RN 72850-64-7).

It is preferred to apply the compositions of the invention so that the total amount of safener is between 1 to 500 g per hectare.

Preferably the mixing ratio of compound (A) to safener is from 100:1 to 1:10, especially from 20:1 to 1:1.

Crop plants that can be protected by the safeners against the harmful action of the above-mentioned herbicides include the transgenic useful plant crops mentioned above.

Preferred formulations have especially the following compositions (%=percent by weight):

Emulsifiable Concentrates:

| | |
|---|---|
| active ingredient mixture: | 1 to 90%, preferably 5 to 20% |
| surfactant: | 1 to 30%, preferably 10 to 20% |
| liquid carrier: | 5 to 94%, preferably 70 to 85% |

Dusts:

| | |
|---|---|
| active ingredient mixture: | 0.1 to 10%, preferably 0.1 to 5% |
| solid carrier: | 99.9 to 90%, preferably 99.9 to 99% |

Suspension concentrates:

| | |
|---|---|
| active ingredient mixture: | 5 to 75%, preferably 10 to 50% |
| water: | 94 to 24%, preferably 88 to 30% |
| surfactant: | 1 to 40%, preferably 2 to 30% |

Wettable powders:

| | |
|---|---|
| active ingredient mixture: | 0.5 to 90%, preferably 1 to 80% |
| surfactant: | 0.5 to 20%, preferably 1 to 15% |
| solid carrier: | 5 to 95%, preferably 15 to 90% |

Granules:

| | |
|---|---|
| active ingredient mixture: | 0.1 to 30%, preferably 0.1 to 15% |
| solid carrier: | 99.5 to 70%, preferably 97 to 85% |

The following Examples further illustrate, but do not limit, the invention.

| F1. Wettable powders | a) | b) | c) | d) |
|---|---|---|---|---|
| active ingredient mixture | 5% | 25% | 50% | 80% |
| sodium lignosulfonate | 4% | — | 3% | — |

-continued

| F1. Wettable powders | a) | b) | c) | d) |
|---|---|---|---|---|
| sodium lauryl sulfate | 2% | 3% | — | 4% |
| sodium diisobutylnaphthalene-sulfonate | — | 6% | 5% | 6% |
| octylphenol polyglycol ether (7-8 mol of ethylene oxide) | — | 1% | 2% | — |
| highly disperse silicic acid | 1% | 3% | 5% | 10% |
| kaolin | 88% | 62% | 35% | — |

The active ingredient is thoroughly mixed with the adjuvants and the mixture is thoroughly ground in a suitable mill, yielding wettable powders which can be diluted with water to give suspensions of any desired concentration.

| F8. Suspension concentrates | a) | b) | c) | d) |
|---|---|---|---|---|
| active ingredient mixture | 3% | 10% | 25% | 50% |
| ethylene glycol | 5% | 5% | 5% | 5% |
| nonylphenol polyglycol ether (15 mol of ethylene oxide) | — | 1% | 2% | — |
| sodium lignosulfonate | 3% | 3% | 4% | 5% |
| carboxymethylcellulose | 1% | 1% | 1% | 1% |
| 37% aqueous formaldehyde solution | 0.2% | 0.2% | 0.2% | 0.2% |
| silicone oil emulsion | 0.8% | 0.8% | 0.8% | 0.8% |
| water | 87% | 79% | 62% | 38% |

The finely ground active ingredient is intimately mixed with the adjuvants, yielding a suspension concentrate from which suspensions of any desired concentration can be obtained by dilution with water.

The invention is illustrated by the following, non-limiting, examples;

BIOLOGICAL EXAMPLES

The herbicidal action to be expected, We, for a given combination of two herbicides can be calculated as follows (see COLBY, S. R. "Calculating synergistic and antagonistic response of herbicide combinations". Weeds 15, pages 20-22; 1967):

$$We = X + [Y \cdot (100-X)/100]$$

wherein:
X=% herbicidal action in the case of treatment with active ingredient (A) using an application rate of p kg per hectare, in comparison with untreated control (=0%).
Y=% herbicidal action in the case of treatment with active ingredient (B) using an application rate of q kg per hectare, in comparison with untreated control.
We=expected herbicidal action (% herbicidal action in comparison with untreated control) after treatment with active ingredient (A) and active ingredient (B) at a rate of application of p+q kg of active ingredient per hectare.
If the action actually observed is greater than the expected value We, there is a synergistic effect.
Trial Description, Pre-Emergence Test:
Monocotyledonous and dicotyledonous test plants are sown in standard soil in plastics pots. The plants tested were: Maize (ZEAMX), Ipomea purpurea (PHBPU), Euphorbia heterophylla (EPHHL), Panicum millenacearum (PANMI). Immediately after sowing, the test compounds in aqueous suspension are applied by spraying (200 litres of water/ha). (A) was formulated as a SC50, and (B1), (B2) and (B3) were formulated as WP25; 1% adjuvant crop oil concentrate (Agridex) (v/v) was added to all treatments. The compounds were applied alone and in combination as tank mixtures. The rates of application depend on the optimum concentrations determined under field conditions and greenhouse conditions. The test plants are then cultivated in a greenhouse under optimum conditions. Evaluation of the tests is made after 21 days (% action, 100%=plants have died, 0%=no phytotoxic action).

TABLE 1

Observed plant damage 21 days after treatment (Pre-emergence)

| Treatment | Rate g/ha | ZEAMX | PHBPU | EPHHL | PANMI |
|---|---|---|---|---|---|
| (A) | 12.5 | 0 | 0 | 0 | 0 |
|  | 25 | 0 | 0 | 0 | 0 |
|  | 50 | 0 | 0 | 15 | 70 |
|  | 100 | 0 | 75 | 40 | 100 |
|  | 200 | 0 | 95 | 75 | 100 |
| (B3) | 5 | 0 | 0 | 0 | 0 |
|  | 10 | 0 | 0 | 0 | 0 |
|  | 20 | 0 | 0 | 0 | 0 |
|  | 40 | 0 | 0 | 0 | 0 |
|  | 80 | 0 | 55 | 30 | 98 |
| (B1) | 18.75 | 0 | 0 | 0 | 15 |
|  | 37.5 | 0 | 0 | 0 | 65 |
|  | 75 | 0 | 0 | 75 | 80 |
|  | 150 | 0 | 0 | 75 | 100 |
|  | 300 | 0 | 85 | 100 | 100 |
| (B2) | 18.75 | 0 | 0 | 0 | 0 |
|  | 37.5 | 0 | 0 | 0 | 0 |
|  | 75 | 0 | 0 | 0 | 0 |
|  | 150 | 0 | 20 | 100 | 40 |
|  | 300 | 0 | 75 | 100 | 98 |
| (A) + (B3) | 12.5 + 5 | 0 | 0 | 0 | 20 |
|  | 25 + 10 | 0 | 20 | 15 | 35 |
|  | 50 + 20 | 0 | 75 | 60 | 65 |
|  | 100 + 40 | 0 | 80 | 80 | 95 |
|  | 200 + 80 | 15 | 100 | 75 | 100 |
| (A) + (B1) | 12.5 + 18.75 | 0 | 0 | 20 | 55 |
|  | 25 + 37.5 | 0 | 0 | 65 | 60 |
|  | 50 + 75 | 0 | 0 | 90 | 90 |
|  | 100 + 150 | 0 | 85 | 100 | 100 |
|  | 200 + 300 | 0 | 100 | 100 | 100 |
| (A) + (B2) | 12.5 + 18.75 | 0 | 0 | 0 | 0 |
|  | 25 + 37.5 | 0 | 0 | 0 | 100 |
|  | 50 + 75 | 0 | 75 | 75 | 98 |
|  | 100 + 150 | 0 | 95 | 100 | 100 |
|  | 200 + 300 | 0 | 100 | 100 | 100 |

TABLE 2

Difference of observed values to expected values in pre-emergence
The mixtures of (A) with (B1), (B2) and (B3) were evaluated
for synergistic effects using the Colby-formula.

| Treatment | Rate g/ha | ZEAMX | PHBPU | EPHHL | PANMI |
|---|---|---|---|---|---|
| (A) + (B3) | 12.5 + 5 | 0 | 0 | 0 | 20 |
|  | 25 + 10 | 0 | 20 | 15 | 35 |
|  | 50 + 20 | 0 | 75 | 45 | −5 |
|  | 100 + 40 | 0 | 5 | 40 | −5 |
|  | 200 + 80 | 15 | 2.25 | −7.5 | 0 |
| (A) + (B1) | 12.5 + 18.75 | 0 | 0 | 20 | 40 |
|  | 25 + 37.5 | 0 | 0 | 65 | −5 |
|  | 50 + 75 | 0 | 0 | 11.25 | −4 |
|  | 100 + 150 | 0 | 10 | 15 | 0 |
|  | 200 + 300 | 0 | 0.75 | 0 | 0 |
| (A) + (B2) | 12.5 + 18.75 | 0 | 0 | 0 | 0 |
|  | 25 + 37.5 | 0 | 0 | 0 | 100 |
|  | 50 + 75 | 0 | 75 | 60 | 28 |
|  | 100 + 150 | 0 | 15 | 0 | 0 |
|  | 200 + 300 | 0 | 1.25 | 0 | 0 |

Trial Description Post-Emergence Test:
The test plants are raised in plastics pots under greenhouse conditions as far as the 2- to 3-leaf stage. A standard soil is used as the cultivation substrate. The plants tested were:

Maize (ZEAMX), Ipomea purpurea (PHBPU), Sorghum vulgare (SORVU), Euphorbia heterophylla (EPHHL), Panicum millenacearum (PANMI). At the 2- to 3-leaf stage, the herbicides are applied individually and as mixtures to the test plants. The test compounds are applied in the form of an aqueous suspension in 200 litres of water/ha. (A) was formulated as a SC50, and (B1), (B2) and (B3) were formulated as WP25; 1% adjuvant crop oil concentrate (Agridex) (v/v) was added to all treatments. The compounds were applied alone and in combination as tank mixtures. The rates of application depend on the optimum concentrations determined under field conditions and greenhouse conditions. Evaluation of the tests is made after 21 days (% action, 100%=plants have died, 0%=no phytotoxic action).

TABLE 3

Observed plant damage 21 days after treatment (Post-emergence)

| Treatment | Rate g/ha | ZEAMX | PHBPU | SORVU | EPHHL | PANMI |
|---|---|---|---|---|---|---|
| (A) | 12.5 | 0 | 0 | 0 | 0 | 0 |
|  | 25 | 0 | 20 | 0 | 0 | 35 |
|  | 50 | 0 | 20 | 0 | 15 | 65 |
|  | 100 | 0 | 75 | 0 | 35 | 65 |
|  | 200 | 0 | 85 | 0 | 40 | 75 |
| (B3) | 5 | 0 | 35 | 0 | 0 | 0 |
|  | 10 | 0 | 55 | 0 | 20 | 20 |
|  | 20 | 0 | 20 | 0 | 50 | 80 |
|  | 40 | 0 | 25 | 0 | 65 | 90 |
|  | 80 | 20 | 80 | 0 | 90 | 90 |
| (B1) | 18.75 | 0 | 30 | 0 | 65 | 60 |
|  | 37.5 | 0 | 50 | 0 | 80 | 70 |
|  | 75 | 0 | 55 | 0 | 90 | 75 |
|  | 150 | 0 | 70 | 10 | 90 | 70 |
|  | 300 | 0 | 70 | 35 | 98 | 90 |
| (B2) | 18.75 | 0 | 0 | 0 | 65 | 0 |
|  | 37.5 | 0 | 25 | 0 | 75 | 20 |
|  | 75 | 0 | 55 | 0 | 80 | 20 |
|  | 150 | 0 | 60 | 0 | 98 | 65 |
|  | 300 | 0 | 60 | 0 | 100 | 50 |
| (A) + (B3) | 12.5 + 5 | 0 | 25 | 0 | 50 | 45 |
|  | 25 + 10 | 0 | 60 | 0 | 80 | 80 |
|  | 50 + 20 | 0 | 85 | 0 | 75 | 85 |
|  | 100 + 40 | 0 | 95 | 0 | 100 | 95 |
|  | 200 + 80 | 0 | 98 | 35 | 100 | 100 |
| (A) + (B1) | 12.5 + 18.75 | 0 | 80 | 0 | 60 | 65 |
|  | 25 + 37.5 | 0 | 90 | 25 | 75 | 75 |
|  | 50 + 75 | 0 | 95 | 55 | 90 | 85 |
|  | 100 + 150 | 0 | 85 | 55 | 98 | 95 |
|  | 200 + 300 | 0 | 100 | 75 | 100 | 100 |
| (A) + (B2) | 12.5 + 18.75 | 0 | 30 | 0 | 55 | 20 |
|  | 25 + 37.5 | 0 | 75 | 0 | 75 | 55 |
|  | 50 + 75 | 0 | 95 | 30 | 100 | 75 |
|  | 100 + 150 | 0 | 99 | 55 | 95 | 95 |
|  | 200 + 300 | 0 | 99 | 75 | 100 | 100 |

TABLE 4

Difference of observed values to expected values in post-emergence
The mixtures of (A) with (B1), (B2) and (B3) were evaluated
for synergistic effects using the Colby-formula.

| Treatment | Rate g/ha | ZEAMX | PHBPU | SORVU | EPHHL | PANMI |
|---|---|---|---|---|---|---|
| (A) + (B3) | 12.5 + 5 | 0 | −10 | 0 | 50 | 45 |
|  | 25 + 10 | 0 | −4 | 0 | 60 | 32 |
|  | 50 + 20 | 0 | 49 | 0 | 18 | −8 |
|  | 100 + 40 | 0 | 14 | 0 | 23 | −2 |
|  | 200 + 80 | −20 | 1 | 35 | 6 | 3 |
| (A) + (B1) | 12.5 + 18.75 | 0 | 50 | 0 | −5 | 5 |
|  | 25 + 37.5 | 0 | 30 | 25 | −5 | −6 |
|  | 50 + 75 | 0 | 31 | 55 | −2 | −6 |
|  | 100 + 150 | 0 | −8 | 45 | 5 | 6 |
|  | 200 + 300 | 0 | 5 | 40 | 1 | 3 |
| (A) + (B2) | 12.5 + 18.75 | 0 | 30 | 0 | −10 | 20 |
|  | 25 + 37.5 | 0 | 35 | 0 | 0 | 7 |
|  | 50 + 75 | 0 | 31 | 30 | 17 | 3 |
|  | 100 + 150 | 0 | 9 | 55 | −4 | 7 |
|  | 200 + 300 | 0 | 5 | 75 | 0 | 13 |

The invention claimed is:

1. An herbicidal composition comprising:
   (A) 3-[[[5-(difluoromethoxy)-1-methyl-3-(trifluoromethyl)-1H-pyrazol-4-yl]methyl]sulfonyl]-4,5-dihydro-5,5-dimethyl-isoxazole, or an herbicidally effective salt; and
   (B) a second herbicide selected from:
      (B1) 4-hydroxy-3-[[2-[(2-methoxyethoxy)methyl]-6-(trifluoromethyl)-3-pyridinyl]carbonyl]-bicyclo[3.2.1]oct-3-en-2-one,
      (B2) tembotrione, and
      (B3) topramezone,
   or their herbicidally effective salts;
   wherein (A):(B) are in a syngergistic weight ratio between 1:100 and 100:1.

2. A composition according to claim 1, wherein component (B) is 4-hydroxy-3-[[2-[(2-methoxyethoxy)methyl]-6-(trifluoromethyl)-3-pyridinyl]carbonyl]-bicyclo[3.2.1]oct-3-en-2-one, or a herbicidally effective salt.

3. The composition according to claim 2, further comprising (C) isoxadifen-ethyl.

4. The composition according to claim 3, wherein the ratio of (A):(C) is 20:1 to 1:1.

5. The composition according to claim 3, wherein the active ingredients are 5 to 20% by weight.

6. The composition according to claim 5, further comprising a surfactant at 10 to 20% by weight.

7. The composition according to claim 3, wherein the active ingredients are 10 to 50% by weight.

8. The composition according to claim 7, further comprising a surfactant at 2 to 30% by weight.

9. The composition according to claim 3, wherein (A):(B) are in a weight ratio of about 1:1.5.

10. The composition according to claim 9, wherein (A):(B) are in a weight ratio of 1:1.5.

11. A composition according to claim 1, wherein component (B) is tembotrione, or a herbicidally effective salt.

12. A composition according to claim 1, wherein component (B) is topramezone, or a herbicidally effective salt.

13. A composition according to claim 1, wherein the ratio of (A):(B) is between about 2.5:1 to 1.1.5.

14. A composition according to claim 13, further comprising a safener selected from cloquintocet-mexyl or a salt thereof, cyprosulfamide and N-isopropyl-4-(2-methoxy-benzoylsulfamoyl)-benzamide.

15. A composition according to claim 14, further comprising an adjuvant crop oil concentrate.

16. A composition according to claim 1, wherein each of component (A) and (B) is applied at a rate from 1 to 300 g ai/ha.

17. The composition according to claim 1, wherein the herbicidal composition consists essentially of (A) and (B).

18. A method for controlling undesirable vegetation in a crop of useful plants, comprising applying to the locus of such vegetation a herbicidally effective amount of a composition as claimed in claim 1.

19. A method according to claim 18, wherein the crops of useful plants are maize, soya or a cereal.

20. A method according to claim 18, wherein the crop of useful plants is maize.

21. A method according to claim 18, wherein the crop of useful plants is soya.

22. A method for controlling undesirable vegetation in a crop of useful plants, comprising separately applying to the locus of such vegetation:
   (A) 3-[[[5-(difluoromethoxy)-1-methyl-3-(trifluoromethyl)-1H-pyrazol-4-yl]methyl]sulfonyl]-4,5-dihydro-5,5-dimethyl-isoxazole, or a herbicidally effective salt; and
   (B) a second herbicide selected from:
      (B1) 4-hydroxy-3-[[2-[(2-methoxyethoxy)methyl]-6-(trifluoromethyl)-3-pyridinyl]carbonyl]-bicyclo[3.2.1]oct-3-en-2-one,
      (B2) tembotrione, and
      (B3) topramezone,
   or their herbicidally effective salts;
   wherein (A):(B) are in a synergistic weight ratio between 1:100 and 100:1.

23. A method according to claim 22, wherein each of component (A) and (B) is applied at a rate from 1 to 300 g ai/ha.

24. The method according to claim 22, wherein the method for controlling undesirable vegetation consists essentially of applying (A) and (B).

25. An herbicidal composition comprising:
   (A) 3-[[[5-(difluoromethoxy)-1-methyl-3-(trifluoromethyl)-1H-pyrazol-4-yl]methyl]sulfonyl]-4,5-dihydro-5,5-dimethyl-isoxazole, or an herbicidally effective salt;
   (B) a synergistically effective amount of a second herbicide selected from:
      (B1) 4-hydroxy-3-[[2-[(2-methoxyethoxy)methyl]-6-(trifluoromethyl)-3-pyridinyl]carbonyl]-bicyclo[3.2.1]oct-3-en-2-one,
      (B2) tembotrione, and
      (B3) topramezone,
   or their herbicidally effective salts; and
   (C) a safener selected from cloquintocet-mexyl or a salt thereof, fenchlorazole, fenchlorazole-ethyl, mefenpyr, mefenpyr-diethyl, isoxadifen, isoxadifen-ethyl, furilazole or the corresponding R isomer, benoxacor, dichlormid, MON4660, oxabetrinil, cyometrinil or the corresponding (Z) isomer, fenclorim, cyprosulfamide, N-isopropyl-4-(2-methoxy-benzoylsulfamoyl)-benzamide, naphthalic anhydride and flurazole;
   wherein (A):(B) are in a synergistic weight ratio between 1:100 and 100:1.

26. A method for controlling undesirable vegetation in a crop of useful plants, comprising applying to the locus of such vegetation a herbicidally effective amount of a composition as claimed in claim 25.

27. A method according to claim 26, wherein the rate of application of safener is from 1 to 500 g/ha.

28. A method according to claim 26, wherein the crops of useful plants are maize, soya or a cereal.

29. A method according to claim 26, wherein the crop of useful plants is maize.

30. A method according to claim 26, wherein the crop of useful plants is soya.

31. The composition according to claim 25, wherein the herbicidal composition consists essentially of (A), (B), and (C).

32. An herbicidal composition comprising:
   (A) 3-[[[5-(difluoromethoxy)-1-methyl-3-(trifluoromethyl)-1H-pyrazol-4-yl]methyl]sulfonyl]-4,5-dihydro-5,5-dimethyl-isoxazole, or a herbicidally effective salt;
   (B) 4-hydroxy-3-[[2-[(2-methoxyethoxy)methyl]-6-(trifluoromethyl)-3-pyridinyl]carbonyl]-bicyclo[3.2.1]oct-3-en-2-one or an herbicidally effective salt thereof; and
   (C) a safener selected from cloquintocet-mexyl or a salt thereof, cyprosulfamide and N-isopropyl-4-(2-methoxy-benzoyl sulfamoyl)-benzamide;

wherein (A):(B) are in a synergistic weight ratio between 1:100 and 100:1.

33. The composition according to claim 32, wherein the herbicidal composition consists essentially of (A), (B), and (C).

\* \* \* \* \*